March 12, 1946. T. F. McDOUGAL 2,396,590
CONTROLLING MECHANISM FOR MULTIPLE WING HELICOPTER ROTORS
Filed May 22, 1943 5 Sheets-Sheet 1

Inventor
Thomas Franklin McDougal

By Clarence A. O'Brien
and Harvey B. Jacobson
Attorneys

March 12, 1946.   T. F. McDOUGAL   2,396,590
CONTROLLING MECHANISM FOR MULTIPLE WING HELICOPTER ROTORS
Filed May 22, 1943   5 Sheets-Sheet 4

Inventor
Thomas Franklin McDougal

By Clarence A. O'Brien
and Harvey B. Jacobson
Attorneys

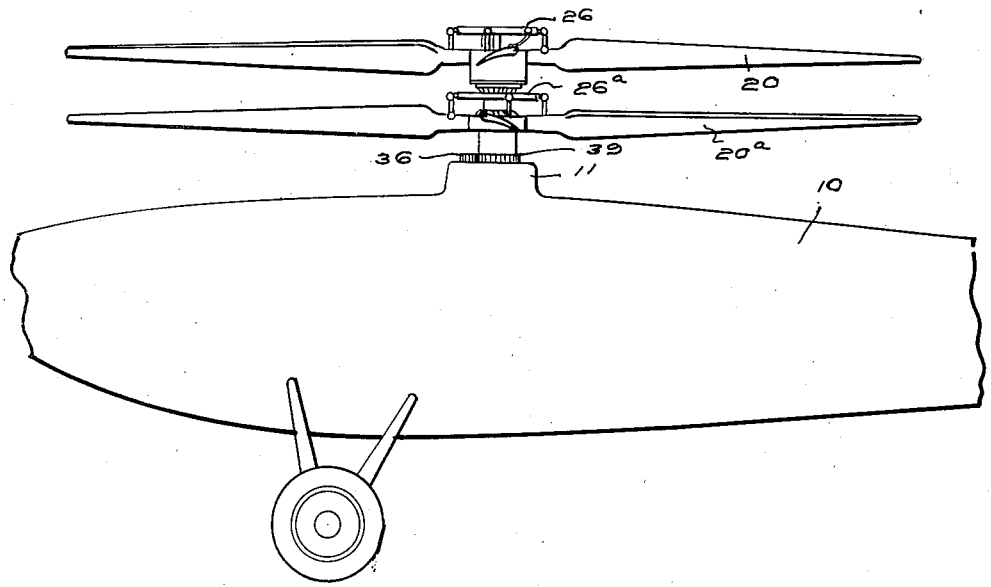

Patented Mar. 12, 1946

2,396,590

UNITED STATES PATENT OFFICE 2,396,590

CONTROLLING MECHANISM FOR MULTIPLE WING HELICOPTER ROTORS

Thomas Franklin McDougal, Fairmont, W. Va.

Application May 22, 1943, Serial No. 488,104

1 Claim. (Cl. 244—17)

This improvement in helicopter construction provides for mounting the supporting surfaces, hereinafter called "wings" in two sets of four wings each, on the same turret, one set above the other and revolving in opposite directions.

This will obviously overcome the tendency for the fuselage wabbling as a result of the torque present when a single set of wings is rotated. It will also give a steadier, more easily controlled lift as well as more efficiency, and greater forward speed.

The controls make possible the following various motions of the craft in flight: First, forward or backward movement; second, lateral movement; third, ascent or descent; fourth, turning about; fifth, lateral balance; sixth, longitudinal balance, or a combination of these movements. The craft may also be made to stand still in the air. These motions are accomplished by changing the pitch or angle of attack of the air on the wings during their rotation and at different points in their orbit as will be explained in the following.

An embodiment of my invention is illustrated in the accompanying drawings, in which:

Figure 5 is a fragmentary side elevation of the helicopter in flight.

Like numbers in the different figures refer to the same parts.

Figure 1:
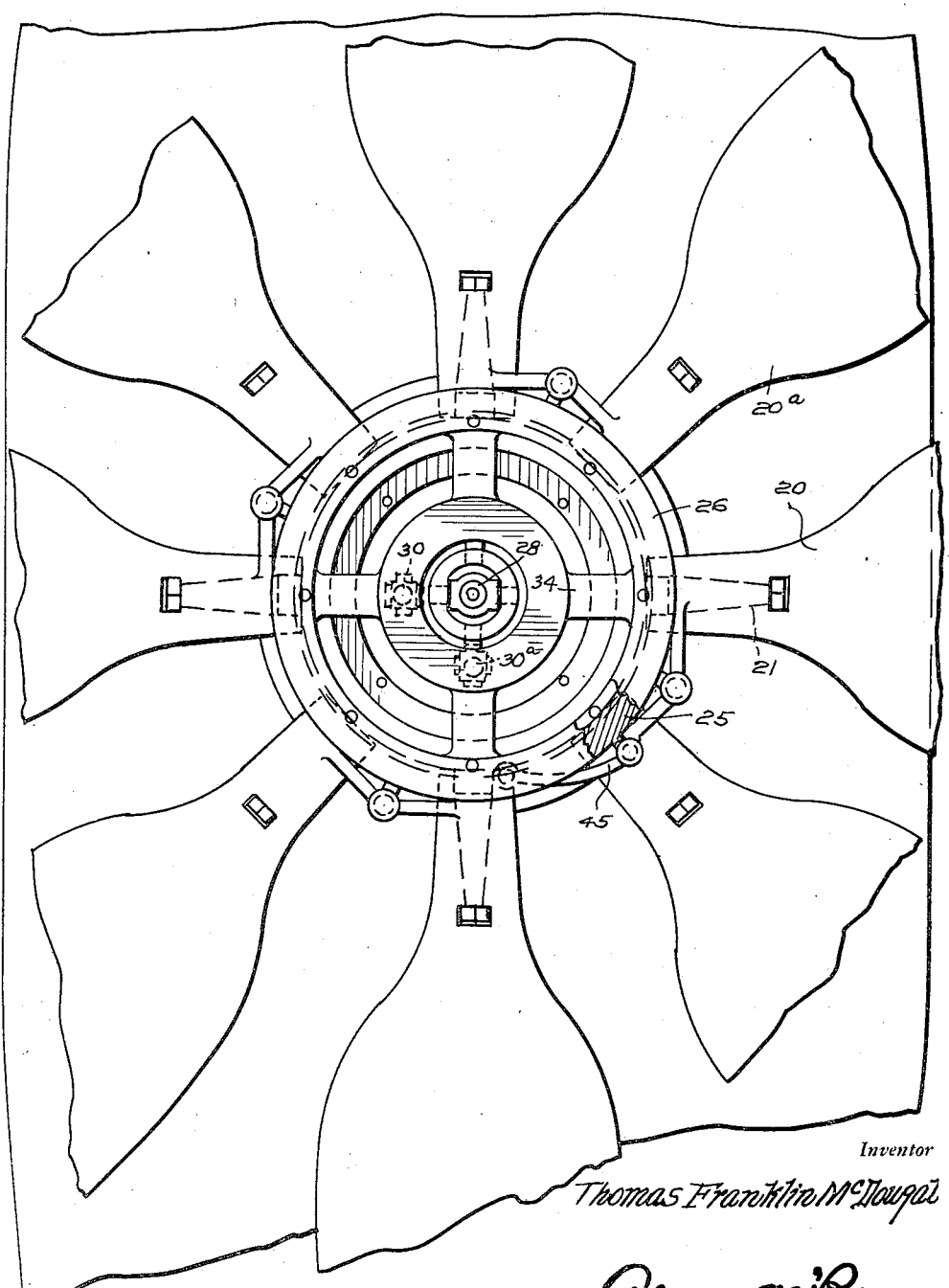
Figure 1 is a fragmentary top plan view of the helicopter showing the mounting of two sets of wings mounted on the helicopter turret.

On top of the fuselage 10 of any suitable type is provided a box-like, cylindrical housing 11 for carrying the turret or column 12 secured thereto by bolts 13 or the like. On this fixed column 12 is rotatively mounted a hollow sleeve 14 for the lower set of wings 20a and at the upper end of said column 12 another hollow sleeve 15 for the upper set of wings 20. On each hollow sleeve is carried an anti-friction bearing here shown as ball bearings 16, and 17, and annular collars 18 and 19 to receive the bearings 16, 17, are furnished on the outer surface of the column 12, see Figure 3.

Figure 2:
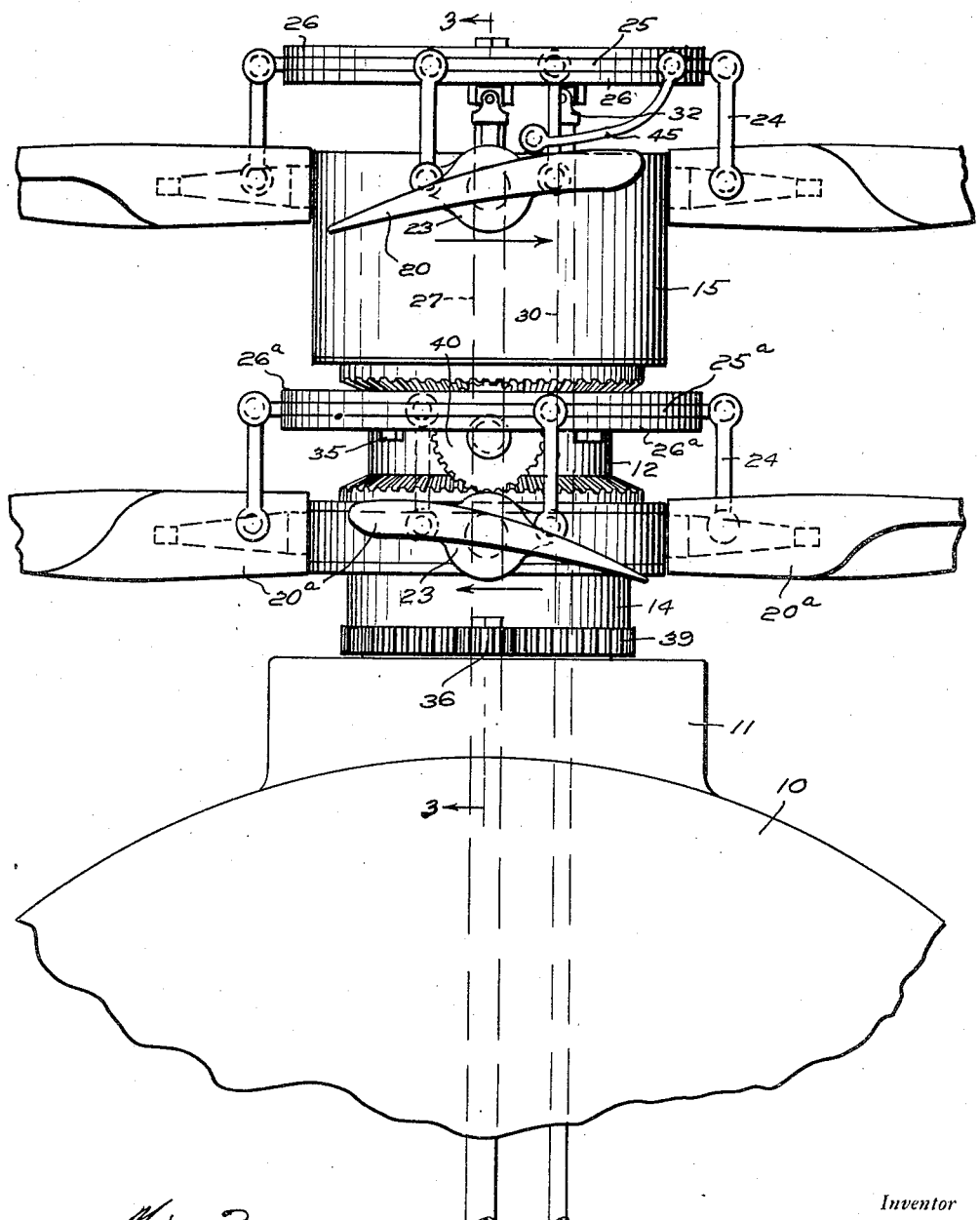
Figure 2 is a fragmentary side elevation of Figure 1.

Each wing 20 and 20a is carried on a spindle or stub shaft 21 on suitable stub shaft bearings so that it may be rotated on a horizontal axis parallel to the longitudinal axis of the wing. The spindles 21 project radially from the respective sleeves 14, 15 of the turret. At the base or hub 22 of each wing 20, 20a is fixedly provided a transversely projecting arm or lever 23 which acts as a crank to rotate the wings 20, 20a to change their pitch. The free end of this crank 23 is connected by a short link 24 to a rotating ring 25 directly above the base of the wings 20 as shown in the drawings, Figures 3 and 4. All the wings 20 of the upper set are attached to the upper rings 25. This ring having positive connection with the sleeve 15 by means of the pivoted link 45 rotates in a groove in the outer rim of a four spoked "spider" 26 preferably having ball bearings, see Figures 1, 2 and 3. The upper spider 26 is attached at its center to a shaft 27 by means of a universal joint 28 which allows the spider 26 to tilt in any direction or move up and down but not to rotate. The upper end of shaft 27 is carried coaxially in the turret 12 in a suitable bearing in the housing 11.

Means for tilting the upper spider 26 is provided by rods 30 and 30a attached by universal joints 32 to points 90° apart on the upper spider 26. It is apparent that when the spider 26 is tilted it will cause the wings 20 to have a high pitch during part of their orbit and a low pitch on the opposite side.

The upper spider shaft 27 can be moved axially, as described hereinafter thus changing the pitch of all the wings in the upper set at once.

The lower spider 26a is almost identical with the upper spider 26. Its spokes 34 project out through large slots 35, shown in Figures 3 and 4, in the turret or column 12 with ample room to allow the same vertical movement as spider 26 and its function is to control the lower set of wings 20a.

To drive the lower set of wings 20a a pinion 36 is secured to the shaft 37 actuated by gear and shaft as at 38 from the power plant located in the housing 11 below the column 12. Said pinion engages a ring gear 39 on the lower sleeve 14. The upper sleeve 15 is rotated by a gear 40a, an idler 40 which is attached with suitable anti-friction bearings to the column 12 between the spokes 34 of the spider 26a and transmits the motion of the lower sleeve 14 to the upper sleeve 15. This insures that both sleeves 14 and 15 have a uniform and equal speed but turn in opposite direction.

The rotating rings 25 are attached by drag links 45 to the corresponding sleeves 14, 15, so that they are vertically movable but rotate with the wings 20 and 20a.

Figure 3:
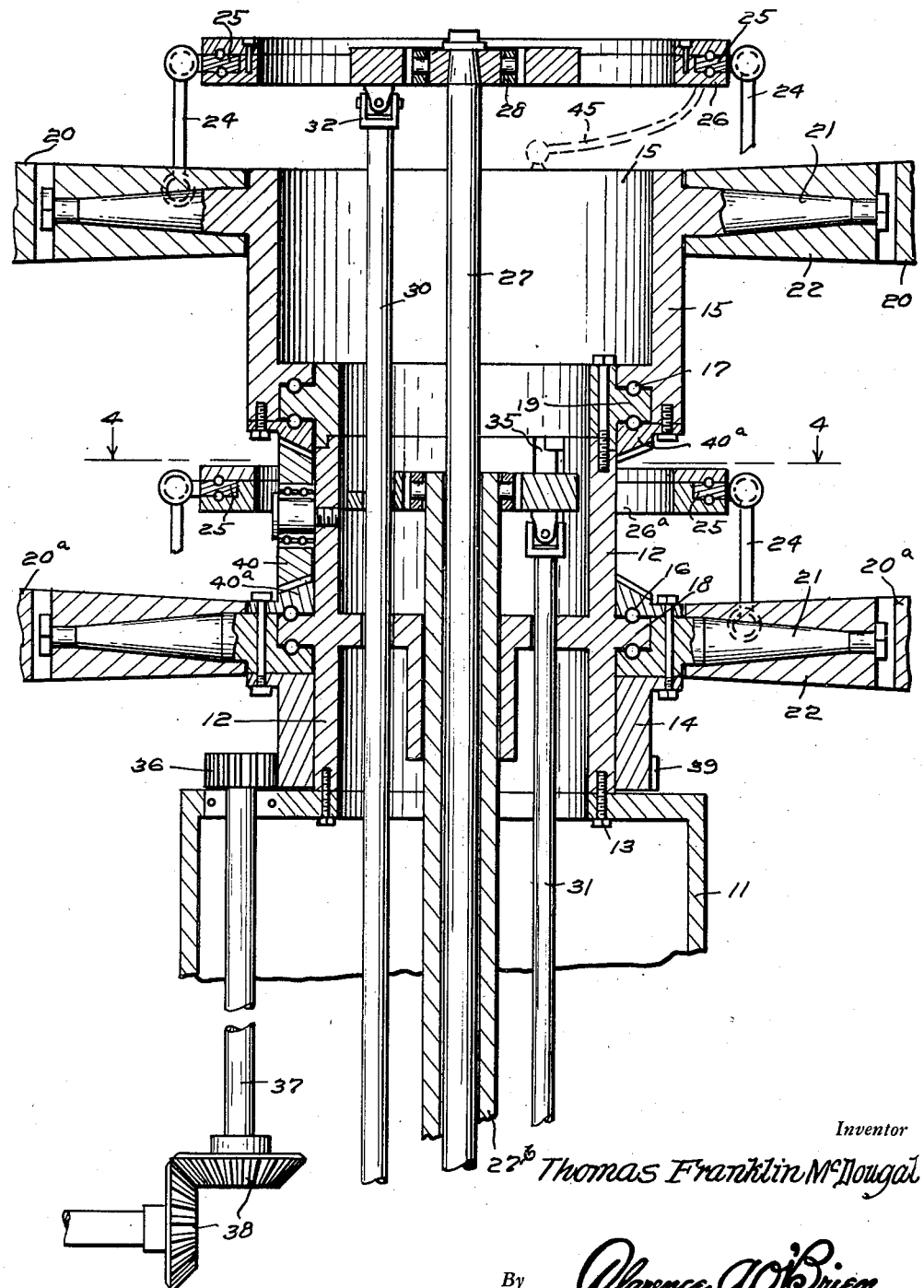
Figure 3 is an axial section of the turret taken along the line 3—3 of Figure 2.
Figure 4:
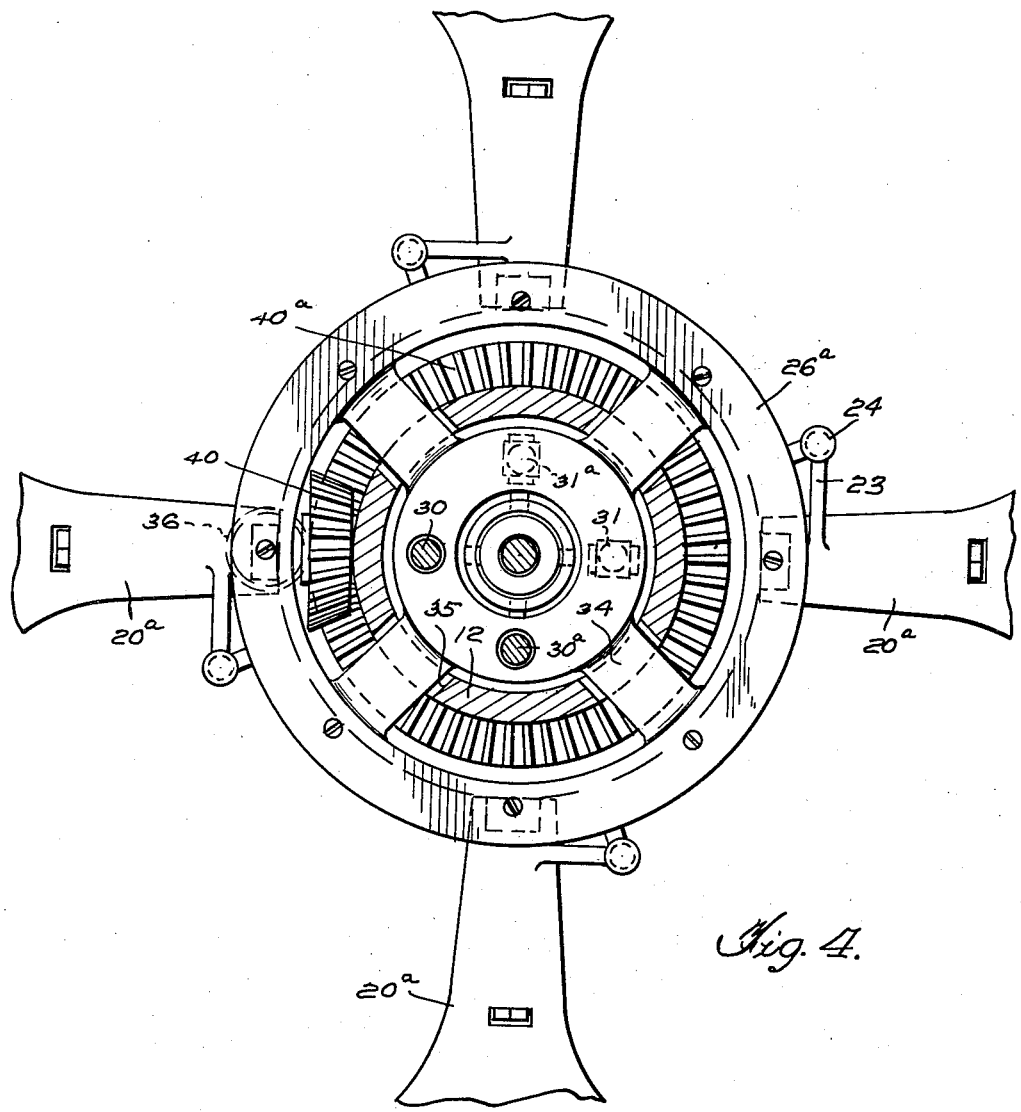
Figure 4 is a horizontal section along line 4—4 of Figure 3, looking down.

Corresponding to the shaft 27 for the upper spider 26, a hollow shaft 27b is supplied for the lower spider 26a. This hollow shaft 27b surrounds shaft 27 as best seen in Figures 3 and 7.

The shafts 27 and 27b and the rods 30, 31, 30a and 31a are independently movable, vertically, by any suitable mechanism, not shown, to give the desired motion to the spiders as set forth hereinafter.

For ascent: The rods 27, 27b are simultaneously lowered, thus lowering the spiders 26 and 26a increasing the pitch and lifting power of all the wings at once through the connecting arms 23 and links 24. Descent is the reverse operation.

Forward travel: By lowering rod 31 the spider 26a is depressed on one side thereof, so that the pitch of the lower wings 20a is high on one side and low on the other. Simultaneously the top spider 26 is tilted in the opposite direction thus making the upper set of wings 20 opposite in effect. If the upper set of wings 20 is rotating clockwise and is high pitched on the right side the resistance of the air will cause a turning and forward movement.

This turning movement is overcome by the other or lower set of wings 20a which also have a forward force thus moving the craft forward. It is also possible to raise the tail of the aircraft and increase the lift and thus by a combination glide and climb gain greater forward motion.

Backward movement is obtained by the reverse operation.

Sideways travel is similar to forward except that rod 31a is lowered and rod 30a is elevated, thus tilting the spiders in the same manner except on an axis 90° removed.

Lateral balance: In this operation both upper and lower spiders are tilted in the same direction thus giving more lift on one side. This is done by raising rod 31 and lowering rod 30 thus tilting the spiders 26 and 26a in the same way.

Longitudinal balance is similar to lateral balance except rods 30a and 31a are lowered and raised respectively, thus tilting spiders so that lift is gained in front or back of the aircraft.

Lowering the shaft 27 and the upper spider 26 carried thereby will decrease the pitch of the upper wings and thereby also lessen the torque. On the other hand the lower spider is raised by a corresponding amount thus increasing the pitch and the torque of the lower set of wings. The difference in the torque required to rotate the upper and lower sets of wings will naturally result in a rotation of the aircraft in a direction opposite to that of the higher pitched wings. A reverse operation from the foregoing will give an opposite rotation to the aircraft.

Actuation of shaft 27 and 27b in opposite vertical directions, will cause the attached spiders 26 and 26a to tilt accordingly. Consequently, the pitch of one set of air foils will increase while that of the other set will decrease. This will result in the higher pitched set of air foils requiring more torque to rotate them than does the other set. Therefore, the aircraft will rotate about its vertical axis in a direction opposite to the direction of rotation of the higher pitched set of air foils.

It is to be definitely understood that I do not wish to limit the application of this invention to the embodiment shown and described except as may be required by the scope of the subjoined claim.

Having described the invention, what is claimed as new is:

Means for controlling the pitch of the blades of a pair of co-axially mounted helicopter rotors, said means comprising a pair of non-rotatable, axially displaceable, concentric shafts, a spider associated with each of said shafts, a universal joint connection between each of said spiders and its associated shaft, a ring member rotatably mounted in each of said spiders, and means for tilting said spiders independently of each other, said shafts constituting means for axially displacing said spiders independently of each other, one of said rings being adapted for connection to one set of rotor blades and the other of said rings being adapted for connection to the other set of rotor blades to provide independent pitch control for each set of blades.

THOMAS FRANKLIN McDOUGAL.